Sept. 23, 1941. O. E. ESVAL ET AL 2,256,475
BALANCED DIRECTIONAL GYROSCOPIC INSTRUMENT
Filed Oct. 18, 1939 4 Sheets-Sheet 1
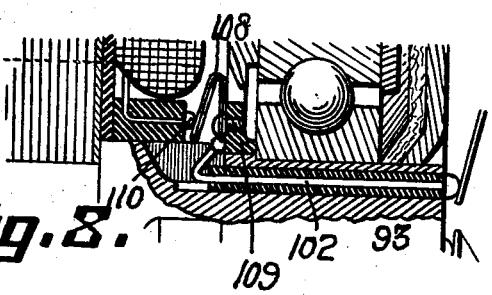
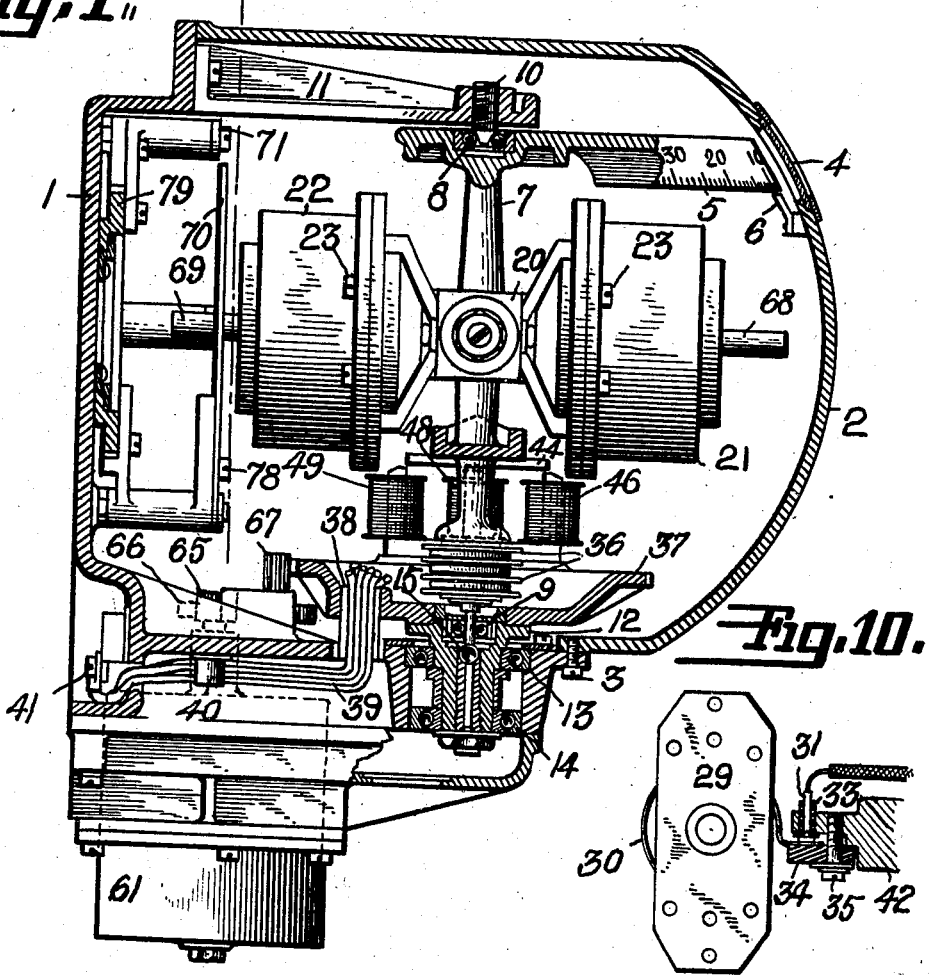
INVENTORS
ORLAND E. ESVAL
JOSEPH FREITAG
BY Herbert N. Thompson
THEIR ATTORNEY

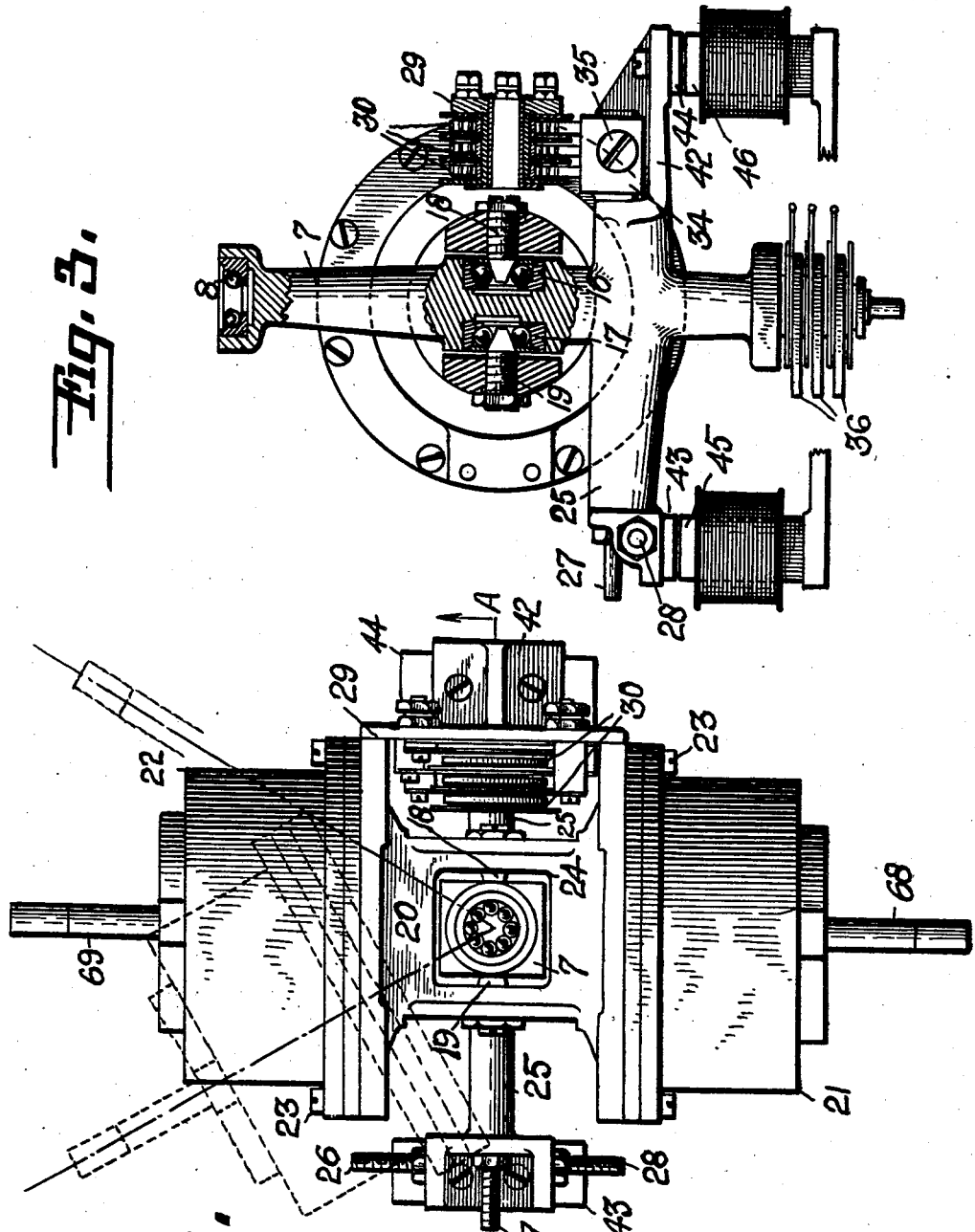

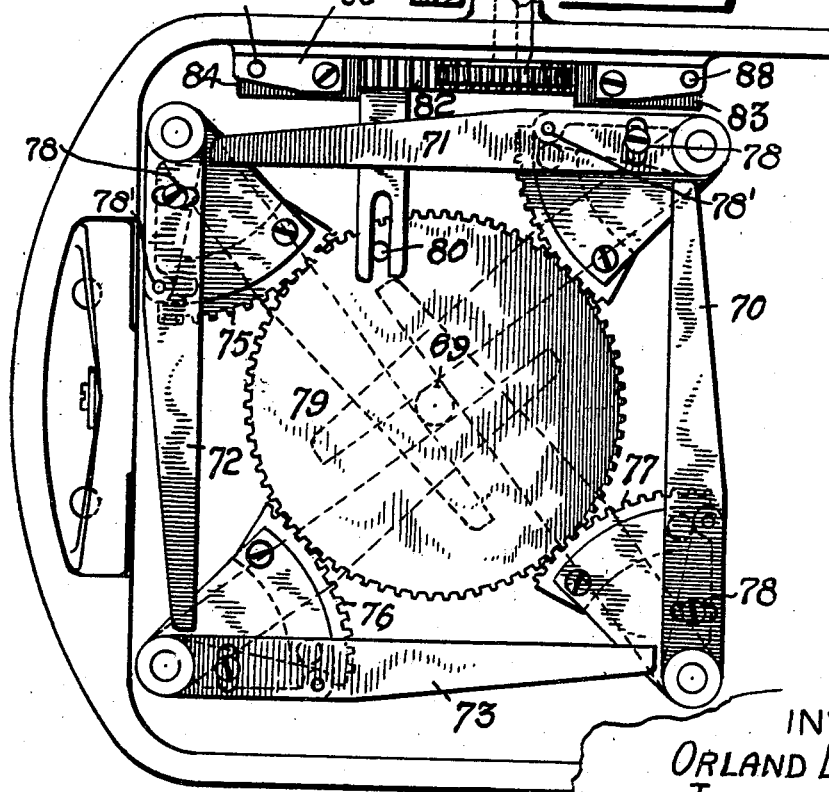

Sept. 23, 1941.  O. E. ESVAL ET AL  2,256,475
BALANCED DIRECTIONAL GYROSCOPIC INSTRUMENT
Filed Oct. 18, 1939  4 Sheets-Sheet 4
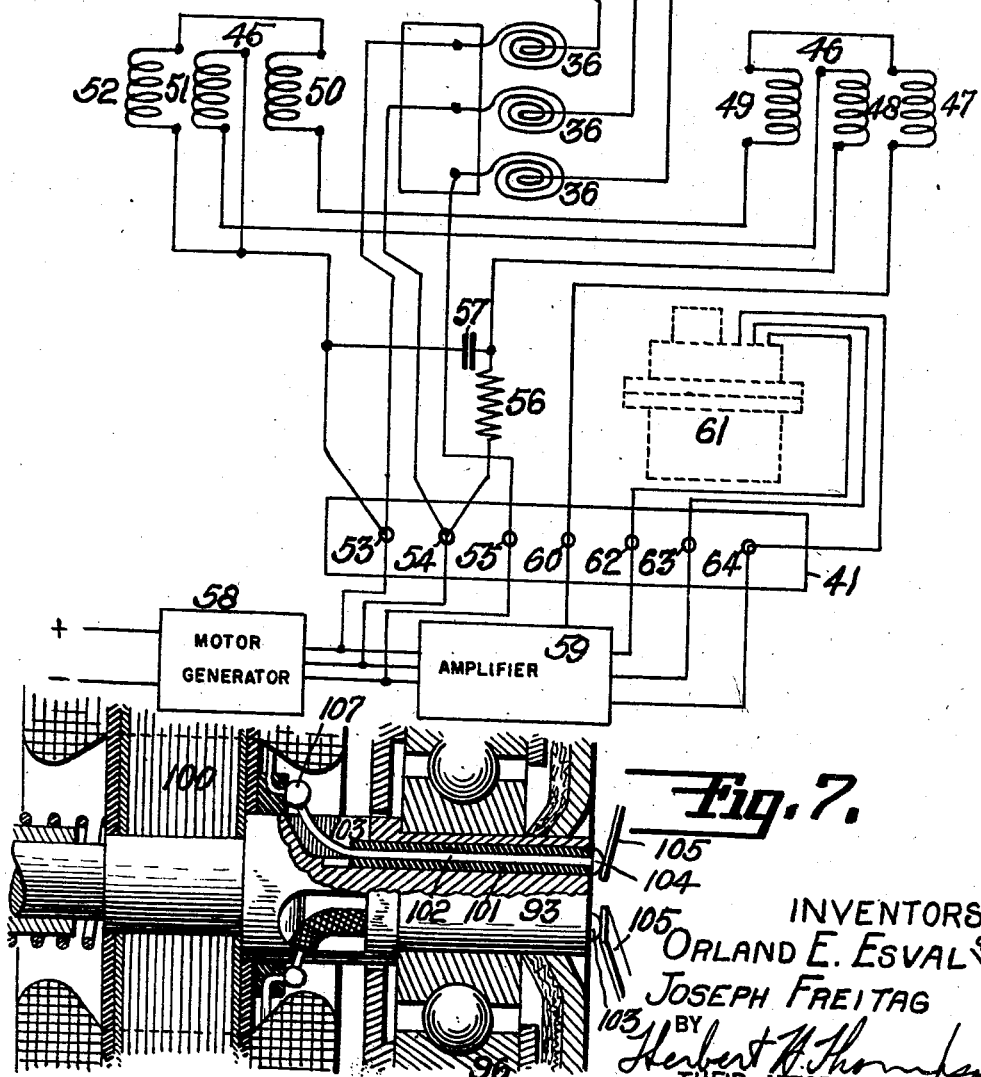
INVENTORS
ORLAND E. ESVAL &
JOSEPH FREITAG
BY
Herbert N. Thompson
THEIR ATTORNEY Patented Sept. 23, 1941

2,256,475

UNITED STATES PATENT OFFICE 2,256,475

BALANCED DIRECTIONAL GYROSCOPIC INSTRUMENT

Orland E. Esval, Allendale, N. J., and Joseph Freitag, Jackson Heights, N. Y., assignors to Sperry Gyroscope Company, Inc., Brooklyn, N. Y., a corporation of New York Application October 18, 1938, Serial No. 235,566

7 Claims. (Cl. 74—5)

This invention relates to gyroscopic direction indicating instruments and provides means for eliminating or reducing the errors commonly found in instruments of this nature, particularly the variable drift which often is a function of the temperature of the gyroscopic element.

It is well known that great difficulties exist in so balancing the present types of standard directional gyroscopes that change of temperature does not cause a change of the location of the center of gravity of the horizontally spinning rotor. Any change, even a very small one, will cause more or less pronounced wandering of the gyroscopic element around its vertical axis of suspension, thereby causing errors in its indications.

The present invention overcomes this difficulty by providing two completely separate individual gyro rotors, each having its own driving means and so disposed with respect to the horizontal and vertical gimbal axes that there exists complete symmetry around all axes as far as the gyroscopes and their mountings are concerned. Our novel directional instrument has no vertical ring, but condenses the vertical ring into a substantially vertical shaft carrying a pair of closely spaced bearings for a horizontal member supporting the gyroscopic elements outwardly therefrom in cantilever fashion. If these gyroscopes are substantially identical, it is obvious that there will be very little difficulty in obtaining an accurate balance of the sensitive element of the instrument around the horizontal axis, and as both gyroscopes increase their temperature together and simultaneously, no shift of the center of gravity should occur due to unequal expansion.

Another object of the invention is to provide a safety factor in operating this instrument, as the device will still be fully operative and only suffer very small loss of accuracy if one of the two gyroscopes becomes inoperative and stops rotating.

This invention also provides means for automatically disconnecting the electrical supply to the inoperative gyroscope, the windings of which might otherwise be damaged by excessive heating, after the rotor has ceased to rotate. There also is provided a novel means to eliminate the error which would result from the contraction of the gyroscope due to its slowly falling temperature after the supply is disconnected.

Referring now to the drawings,

Fig. 1 shows a partly sectionalized side elevation of our novel direction indicating instrument.

Fig. 2 shows a top view of the sensitive element itself.

Fig. 3 shows a partly sectionalized side elevation of the sensitive element of Fig. 2 along line A—A.

Fig. 4 shows the caging mechanism for the gyroscopic element.

Fig. 5 is a continuation of Fig. 4, showing the lever for actuating the caging device.

Fig. 6 is an enlarged cross-sectional view of one of the preferred forms of gyroscope used in this invention.

Fig. 7 is an enlarged cross-section of the shaft of the gyroscope.

Fig. 8 shows the device which holds the temperature of the gyroscope substantially constant after it has stalled.

Fig. 9 is a general wiring diagram.

Fig. 10 illustrates the means of electrically and mechanically connecting the hair spring conductors.

Referring now to Fig. 1, a base structure 1 is suitably secured to the vehicle or craft on which the instrument is carried. A cover 2 secured by screws 3 serves to enclose the instrument and at the same time affords, through a window 4, a view of the dial 5 which swings around a substantially vertical axis and has an indicator 6 connected to the casing 2. The dial 5 comprises only a sector of about 60 to 90° and is carried by a vertical shaft 7 which is pivoted in an upper bearing 8 and a lower bearing 9. The pivot 10 for the upper bearing is carried by a bracket 11 which is fastened to the base structure 1, while the lower bearing 9 is encased in a hub 12, which is journaled in the base structure 1 by means of two ball bearings 13 and 14. A thrust bearing in the form of a steel ball 15 is employed to absorb the pressure of the weight of the gyroscopic element and the shaft.

The vertical shaft 7 in its middle portion carries two ball bearings 16 and 17, as shown in Fig. 3. These ball bearings serve as journals for two adjustable conical pivots 18 and 19 which are carried in a casting 20 which is so shaped as to form the end shells for the two gyroscopic housings 21 and 22. These housings are secured to the shell casting 20 by means of screws 23. As shown in Fig. 2, the shell casting 20 has a central aperture 24 through which the vertical shaft 7 extends and which is shaped in such a way as to allow a limited amount of freedom for the gyroscopic structure to tilt in a vertical plane. The two housings 21 and 22 are identical and contain identical gyroscopic rotors with their driving stators, shown more in detail in Figs. 6, 7 and 8.

An arm 25 extends perpendicular to the gyroscopic axis, as shown in Figs. 2 and 3 and carries a number of screw studs 26, 27 and 28 which serve the purpose of balancing the structure around both horizontal axes by means of nuts threaded onto the studs. Opposite to the arm 25 there is attached to the casting 20 a bracket 29 which carries three small helical springs 30 serving as current conductors to supply the two gyroscopes with alternating current of a suitable high frequency. The free ends of the helical springs 30 are affixed to electrical contacts 31 carried by a bracket 42, but insulated therefrom by Bakelite bushings 33, as shown in Fig. 10. The bracket 42 is integral with the vertical shaft 7 and forms a horizontal projection on it, as shown in Fig. 3. A Bakelite strip 34 is mounted opposite the contacts 31 in such a way that by tightening screw 35 it can be clamped against contacts 31. The free ends of the springs 30 are inserted between the Bakelite strip and the contacts 31 and securely held in position as soon as screw 35 is tightened. This forms an easy means of quickly connecting the springs, at the same time affording the possibility of adjusting these springs so as to stay in their own helix plane without lateral distortion in case of tilt of the gyroscopic structure. From the contacts 31, wires lead to a similar group of helical springs 36, as shown in Figs. 1 and 3, grouped around the lower part of the vertical shaft 7. A suitable bracket, not shown but similar in construction to bracket 32, is employed to fasten the free ends of the springs 36. This bracket is mounted on gear 37, Fig. 1. The bracket itself is mounted behind springs 36 so that it is not visible. From there three wires lead through a hole 38 in the gear 37 and are grouped with other wires into a flexible cable 39 to afford limited horizontal motion for the gear 37. A clamp 40 holds the other end of the cable 39, from where the wires finally lead to a terminal block 41 which serves the purpose of affording convenient means of connecting external supplies and other electrical accessories.

The arm 25 and the shelf 42, extending to either side of the vertical shaft 7, as shown in Fig. 3, also carry two armatures 43 and 44 composed of magnetic material. These armatures are normally located opposite two pick-off transformers 45 and 46, only one of which is visible in Fig. 1. The transformer 46 has three coils 47, 48 and 49, each one encircling one of the three legs of the pick-off transformer. The transformer 45 is identically constructed with coils 50, 51 and 52. Both of these transformers are mounted on the gear 37, which in turn is rigidly connected to the hub 12. In their normal position, the armatures 43 and 44 are symmetrically located with respect to the center legs 48 and 51, respectively, of the two transformers. The center coils 48 and 51 of both transformers are excited from one phase of a three-phase A. C. supply, while the outside coils 47—49 and 50—52, respectively, of each transformer are oppositely connected to each other, but each group of two coils is in series with the other group of two coils in such a way that a differential signal of considerable magnitude is developed as soon as the armatures 43 and 44 are angularly displaced a small amount from their neutral position with respect to the transformers. The secondary coils 47—49 and 50—52 are wound in such a way, that the sense of winding of coils on one transformer is opposed to the sense of winding on the other transformer. Thereby any errors due to induction in these coils caused by the stray fields of the gyroscope stators are completely compensated. The induction causes equal and opposite potentials to appear in the windings, and, as the windings are connected in series, the potentials neutralize each other. In a similar way, the two diametrically disposed transformers prevent mechanical imperfections, such as for instance, looseness of bearings 8 or 9, from causing turn errors in the motor driven part of the system, because such defects will affect both transformers in opposite sense.

The wiring diagram in Fig. 9 shows the coils 47, 48 and 49 of transformer 46, as well as the coils 50, 51 and 52 of transformer 45. The primary coils 48 and 51 are shown as connected in series to the terminals 53 and 54 of the terminal block 41. A phase shifting network consisting of resistor 56 and condenser 57 serves the purpose of adjusting the phase of the exciting current for coils 48 and 51. The primary three-phase current of a relatively high frequency, say 500 or 600 cycles per second, is produced by the motor generator 58 and from there led to the terminals 53, 54 and 55 of the terminal block 41, as well as to an amplifier 59. The differential signal output of coils 47, 49 and 50, 52 is led to terminals 53 and 60 of the terminal block, and from there enters into the amplifier 59, where it is amplified by well known methods to such an extent as to enable suitable control of a motor 61 which is electrically connected to terminals 62, 63 and 64. The three-phase supply as coming from terminals 53, 54 and 55 also passes through the three horizontal hair springs 36, from there through the three vertical hair springs 30, through the contacts 31, and from there in parallel to the two gyroscopes 21 and 22, both of which have three-phase stators. For a more complete description of the follow-up system described, reference may be had to the prior patent of Wittkuhns and Watkins, #1,959,804, dated May 22, 1934, for Noncontacting follow-up systems.

The motor 61 is visible in Fig. 1 and is shown as connected by means of pinion 65, gear 66 and pinion 67 to the azimuth gear 37. From the foregoing explanation it becomes evident that as soon as, due to an angular motion of the vehicle carrying the instrument, the gyroscopic element causes the shaft 7, and thereby the armatures 43 and 44, to turn in azimuth with respect to gear 37 and transformers 45 and 46, the motor 61 will start and run in a suitable direction to cause the follow-up transformers 45 and 46 to maintain their angular relationship with respect to the armatures 43 and 44. To do so, the motor turns the gear 37 and thereby also turns the bracket to which the free ends of the horizontal hair springs 36 are connected, thereby preventing any change of the spring tension around the vertical shaft 7, which otherwise would create a torque around the vertical axis and thereby cause precession of the gyro rotors in a vertical plane around pivots 18 and 19. Inasmuch as the cable 39 is quite flexible, considerable but limited angular displacement of the gyroscopic element is possible without restriction.

As shown in the present embodiment of the invention, the instrument cannot rotate through 360° in azimuth as finally the cable 39 would oppose such motion. However, anyone skilled in the art can easily connect the wires contained in cable 39 to a set of slip rings carried on the bushing 12, from where the stationary brushes could conduct the current to the terminal block 41. It is understood, therefore, that this invention is not limited to gyroscopic devices of the type described, which only have a limited angular freedom.

Each of the gyroscopes 21 and 22 carries at its free end a pin 68 and 69, one of which is used as the point at which the caging mechanism can clamp the gyroscopic structure to a predetermined neutral position. As shown in Fig. 4, the caging mechanism itself consists of four arms 70, 71, 72 and 73 adjustably mounted on gear sectors 74, 75, 76, and 77 in such a way that the relative position between the gear sector and the arm 70 can be experimentally determined and then secured by tightening of the screws 78 and driving in dowel pins 78'. All four gear sectors mesh with a central gear 79 which carries a pin 80 engaged by means of a slot with the arm 81. This arm is secured to a gear rack 82 slidably mounted in two recesses under the bosses 83 and 84. The free ends of the gear rack are milled flat and have detents into which springs 85 and 86 can press loose pins 87 and 88 in such a way as to provide a definite rest for the rack 82 in its two end positions. The rack itself is actuated by a gear 89 secured to a shaft 90 and operated by a lever 91 from outside of the case (Fig 5). Upon turning the lever 91 through a suitable angle, the rack 82 will be slid from one end position to the other end position, thereby forcing the pin 80 to follow this motion, which in turn causes the gear 79 to revolve through a predetermined angle just sufficient to close the four arms 70, 71, 72 and 73 around pin 69 in such a way as to securely hold this pin stationary. The length of the pin 69 and the opening between the four locking arms are so dimensioned that even at maximum angular displacement of the gyroscopic elements, the arms are still able to effect contact with pin 69.

Fig. 6 shows in detail one of the two identical gyroscopes 21 and 22. The end cap 92 may form part of the casting 20, as explained before. A shaft 93 is held within the casing 21 by means of a pin 94 projecting into a slot in shaft 93, so that the shaft cannot rotate. Ball bearings 95 and 96 are provided to allow the rotor 97 to spin freely. This rotor has two side plates 98 and 99 which contain suitable recesses for the bearings 95 and 96. Rigidly fixed to the shaft 93 is a stator 100 consisting of a laminated structure provided with a three-phase winding in suitable slots in well-known manner, and as described more fully in detail in the copending patent application of one of the present applicants, O. E. Esval, now Patent No. 2,193,531, for High speed A. C. driven gyroscopes, March 12, 1940.

Current is conducted to the stator windings through three holes in the shaft 93, as shown in detail in Fig. 7. The three holes are provided with insulating bushings 101, through which a conductor 102 passes to a cut out 103. The other end of the conductor is formed as a round head 104, and springs 105, mounted by means of insulated parts in the cap 92, serve the purpose of conducting current from the terminals 106 to the windings. The inner end of the conductor 102 is connected to one of the ends of the stator winding by means of globules 107 of a low melting solder alloy. The melting point of this material is so chosen that it is somewhat above the normal operating temperature of the stator, so that in normal operation the alloy will not melt. If, however, due to failure of the bearings or other causes, the rotor 97 comes to a stop, the temperature of the stator windings will rapidly increase until the globule of solder 107 will melt and thereby interrupt current flow into the endangered windings. This would now allow the other gyroscope to continue to function normally and would remove the excessive current drain caused by the stalled gyroscope.

According to the invention, another preferred solution of this problem is shown in Fig. 8. In this modification, the conductor 102 is led to a spring 108 secured to a ring 109 of suitable insulating material and rigidly held on the shaft 93. At least two of the contactors are provided with such springs, which by their initial tension make contact with buttons 110, to which the ends of the windings in the stator have been connected. The spring 108 is composed of thermostatic material which, as well known in the art, is composed of two dissimilar materials of different thermal expansion coefficients. The spring is so arranged that at normal operating temperature of the windings, sufficient contact pressure is provided for unimpeded passage of current. If, however, due to stalling of the rotor, the temperature in the windings increases, the thermostatic effect of the spring 108 will finally open the contact, thereby interrupting the current supply to the windings. After the windings have cooled off sufficiently, the decrease in temperature will cause the springs 108 to reestablish contact, whereupon the temperature in the windings will again start to increase. This device therefore enables the maintenance of a substantially constant average temperature in the windings, and thereby in the whole gyroscope, which is only slightly higher than the operating temperature and thereby prevents the relatively large change in mechanical expansion which would result from allowing the windings to become completely de-energized and to cool off to room temperature. In other words, this device will prevent any appreciable variation in thermal expansion between the two separate gyroscopes, no matter whether both are operating or only one.

In operation, the gyroscopic element will be in the caged position and rigidly held against any motion whatever until the gyroscopes have attained full speed. At that time the caging mechanism is released and the follow-up system is energized, whereupon the follow-up motor 61 will fulfill its function of preventing any torques from developing around the vertical axis of the structure. It also will follow accurately any deviation from normal of the gyroscopic element caused by lateral turns of the craft carrying the instrument. It is therefore possible to connect to the gear train 65, 66, 67 another parallel gear train to drive a shaft extending from the instrument to a subsidiary instrument in which it is desired to obtain a motion proportional to the angular motion of the craft, and where considerable torque could be supplied by virtue of the driving torque of the power motor 61.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

One of the advantages of the four-armed caging device described above is that it provides a square opening when in uncaged position, thus giving much greater freedom for the sensitive element compared with the conventional three arm, round opening caging device. With a round opening allowing a maximum angular motion of, say, 30°, no motion normal to the original motion could be allowed without striking the arms. The square opening allows practically equal maximum angular displacements without the danger of striking the arms.

Having described our invention, what we claim and desire to secure by Letters Patent is:

1. In a gyroscopic direction indicating instrument, a support, a shaft pivoted therein at the top and bottom for turning around the vertical axis, two equal and independent gyroscopes having horizontal spin axes, separate spinning means for each gyroscope, and means for symmetrically suspending said gyroscope on opposite sides of said shaft in neutral equilibrium for tilting around a horizontal axis normal to said spin axes with one gyroscope on each side of said vertical shaft, whereby said neutral equilibrium is maintained regardless of change of temperature.

2. In a gyroscopic direction indicator, a support, a shaft pivoted therein for turning around a vertical axis, a pair of rigidly connected substantially equal gyroscopes, each having a casing, a spinning motor and a rotor, and means to pivotally mount said gyroscopes in neutral equilibrium on opposite sides of said shaft symmetrical to said vertical axis of said rotors, whereby said neutral equilibrium is maintained regardless of changes in temperature.

3. In a gyroscopic direction indicator, a support, a pair of substantially equal gyroscopes each having a casing, a spinning motor and a rotor with a horizontal spin axis, a shaft pivotally mounted in said casing for turning around a vertical axis, means for rigidly and coaxially interconnecting said casings, and means for pivotally mounting said first named means in neutral equilibrium on opposite sides of said shaft symmetrical to said vertical axis for tilting around a horizontal axis normal to said spin axis, whereby said neutral equilibrium is maintained over wide ranges of temperature.

4. In a gyroscopic direction maintaining device, a gyroscopic sensitive element comprising two rigidly and coaxially connected gyro casings each containing a rotor electrically spun about a horizontal axis, means for symmetrically suspending said element in neutral equilibrium for turning around a vertical axis and tilting around a horizontal axis normal to said rotor axis, a current supply for said gyroscopes, automatic means between said current supply and the winding of one gyroscope for breaking the circuit to said winding upon abnormal temperature rise therein, and a similar automatic circuit breaker between said current supply and the winding of the other gyroscope whereby, on failure of one gyroscope, the other remains fully operative.

5. In an instrument as claimed in claim 4, said automatic means comprising a pair of normally contact making resilient strips of bi-metallic structure, said strips, by deforming, interrupting said supply as the temperatures rise above a predetermined value.

6. In an instrument as claimed in claim 4, said automatic means comprising a globule of low melting soldering alloy normally connecting said supply to the windings of each of said gyroscopes, whereby said supply to the affected gyroscope only is disconnected by melting of said globule as the temperatures rise above a predetermined value, leaving the other gyroscope fully operative.

7. In a directional gyroscope, in combination with a rotor, an electric motor for spinning the same and a rotor casing, means pivotally supporting said casing for oscillation about a horizontal axis, a second means pivotally supporting the same for rotation about a vertical axis, a follow-up device about said vertical axis, light coil springs leading in current from said follow-up device to the gyro about the vertical axis, and separate light coil springs for leading in current about said horizontal axis, whereby all sliding contacts are avoided about both axes of support of the gyroscope.

ORLAND E. ESVAL.
JOSEPH FREITAG.